Figure 1:
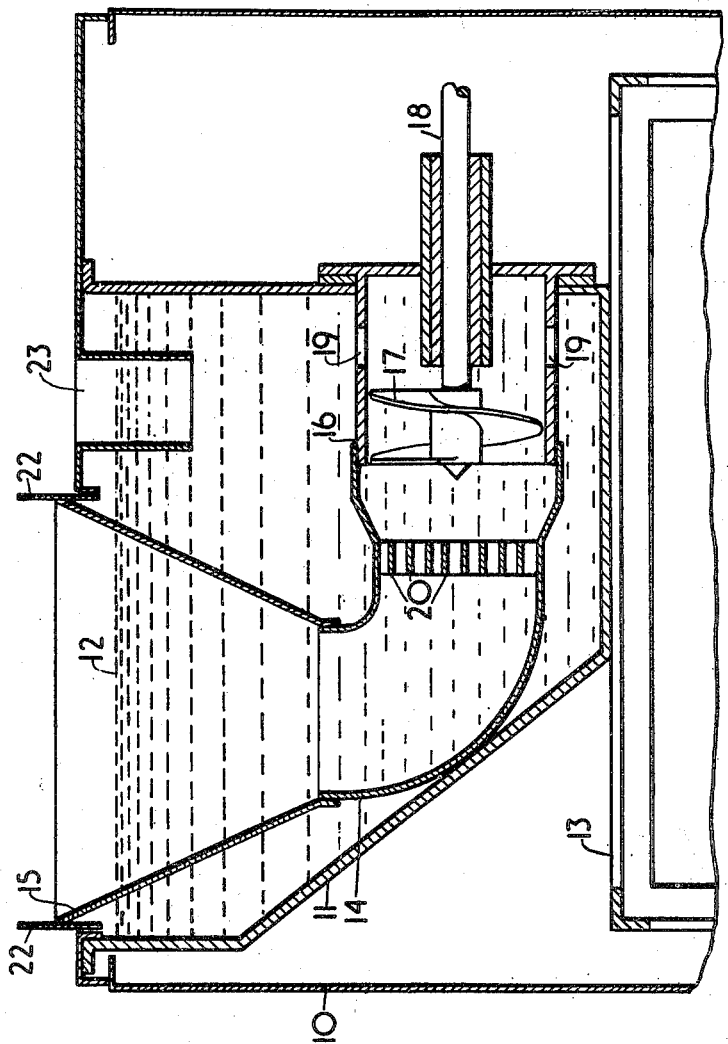

United States Patent Office 3,196,829
Patented July 27, 1965

3,196,829
SOLDERING MACHINES
Victor Bernard Elliott, Wallington, and Reginald John Winslade, Catford, London, England, assignors to Fry's Metal Foundries Limited, London, England
Filed Feb. 21, 1963, Ser. No. 260,133
4 Claims. (Cl. 118—300)

In United States Patent No. 3,056,370 we have described and claimed an apparatus for soldering components to a printed circuit panel comprising a tank to contain molten solder, a nozzle having a narrow, elongated rectangular mouth disposed horizontally and above the normal level of solder in the tank and across which the panel may be traversed with its undersurface in contact with solder emerging from said mouth, a pipe in the tank communicating at one end with the lower end of the nozzle and open at the other end to the solder in the tank and a pump in the pipe which is operative to discharge solder upwardly from the mouth of the nozzle in a smooth, nonturbulent, gently overflowing wave having a level crest.

In the case of the apparatus described in the aforesaid specification the work to be soldered is moved across the wave of solder in a direction transverse to the wave.

The present invention provides a modification of this apparatus which renders it suitable for the soldering of commutators, armatures and the like and which consists in the provision of means for traversing the commutators or like articles through the solder wave in the direction of the length of the wave and at the same time rotating them.

Thus the commutators or like articles may be supported on a supporting rail and a conveyor provided for rolling the articles along the rails. Alternatively the articles may be supported at one end by collets mounted on an endless chain and carrying sprockets which engage a fixed chain and impart rotation to the articles.

The machine may include a fluxing unit which generates a wave of flux in similar fashion to the soldering unit, the work being traversed longitudinally through the flux wave before it reaches the solder wave. If desired, a preheater may be included between the fluxing unit and the soldering unit.

In the soldering apparatus described in United States Patent No. 3,056,370, the nozzle is provided at one end of a U-shaped pipe and a pump, which is at the other end of the pipe, is a bladed impeller similar to a ship's propeller.

We find according to a further feature of the present invention that a more steady and non-turbulent flow of solder in the pipe leading to the nozzle (or of tin in case it is desired to use the apparatus for tinning instead of soldering) can be obtained by the use as the pump of an impeller having a helical blade which has at least one full turn and not more than three full turns and rotates with small clearance in a cylindrical housing.

Preferably the maximum clearance between the impeller and its housing is 1/16". The impeller blade conveniently has 1 to 3 turns. The helix angle at the circumference of the blade may be 3°–30° and is preferably 6°30'. The outer diameter of the helix may be 2"–5" and is preferably 3". The thickness of the blade may be 1/32"–1/8" and is preferably 0.05". It is advantageous to feather down the leading and trailing edges of the blade to a sharp edge.

The impeller may be made of stainless steel or of any other suitable material which is not attacked by or harmful to the metal to be pumped.

The apparatus fitted with this helical pumping impeller may be used with advantage whether the work is moved transversely to or longitudinally of the solder wave.

The advantages of the helical impeller over the multi-blade marine type impeller described in United States Patent No. 3,056,370 are as follows:
 (1) Less turbulent flow,
 (2) No backward flow and surface turbulence on the metal bath above the pump inlet. As a consequence less dross is formed on the bath.
 (3) Achievement of the same metal delivery with lower rotational speeds, or of a higher metal delivery with the same rotational speed, in comparison with a multi-blade impeller.

Figure 2:
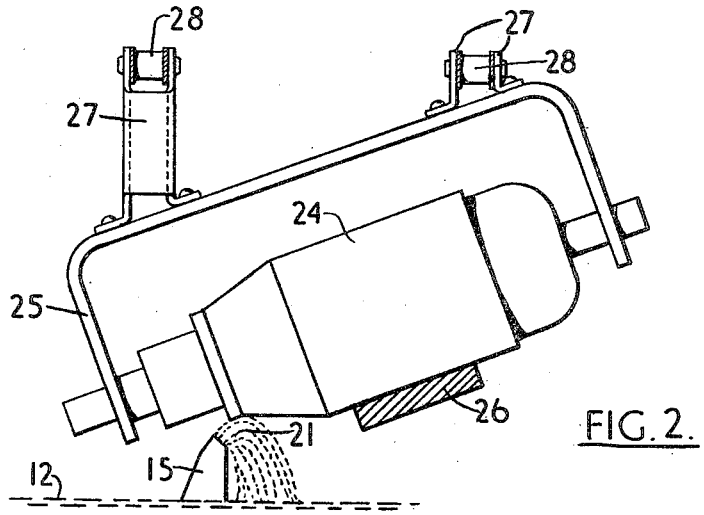
Figure 3:
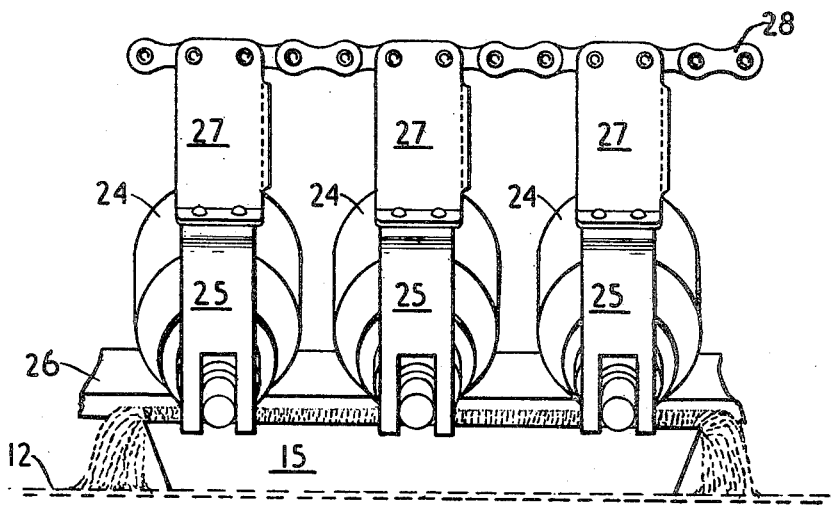

The invention will now be further described with reference to the accompanying drawings, in which:

FIG. 1 is a vertical section through a soldering apparatus according to the invention, FIG. 2 is a section taken in a plane at right angles to the section in FIG. 1, showing the mechanism for traversing armatures through the solder wave, and FIG. 3 is a view looking from the left hand side of FIG. 2.

The apparatus shown in FIG. 1 has an outer casing 10 within which is a solder pot 11 which contains molten solder, the level of the solder is indicated at 12 and the solder is maintained molten by a heater (not shown) contained in an inner casing 13. The pot 11 has an inlet 23 whereby it may be charged with fresh solder.

In the pot 11 is a pipe 14 which communicates at one end with a nozzle 15 of the construction described in United States Patent No. 3,056,370 and at the other with the housing 16 of an impeller having a helical blade 17. The blade 17 is of the configuration already described and rotates with small clearance in the housing 16. The impeller is rotated by a drive shaft 18 driven by a suitable motor (not shown). The impeller pumps molten solder, supplied to the interior of the housing 16 through inlets 19, through the pipe 14, which contains a honeycomb flow straightener 20, and discharges it from the horizontal, elongated, rectilinear mouth of the nozzle 15 as a smooth, non-turbulent, gently overflowing wave having a level crest. The wave may overflow at both sides of the nozzle as described in United States Patent No. 3,056,370, or at one side only as indicated at 21 in FIG. 2.

In the construction of FIG. 1, plates 22 are provided at opposite sides of the nozzle for preventing overspill of the solder. As shown in FIGS. 2 and 3, the articles (here shown as armatures 24) are traversed through the solder wave in its lengthwise direction and are simultaneously rotated. The armatures 24 are held at their ends in carriers 25 and supported by an inclined rail 26. The carriers 25 are suspended by brackets 27 from chains 28 and the armatures 24 are caused to roll as they run along the rail 26 so that the entire periphery of the portion to be soldered will become immersed in the solder wave 21.

The height of the solder wave may be raised by alteration of the speed of the impeller or by altering the size of the intake aperture to the impeller.

What we claim as our invention and desire to secure by Letters Patent is:

1. A soldering or tinning apparatus for use in soldering or tinning operations, comprising a tank to contain molten metal, a nozzle having a narrow, elongated rectangular mouth disposed horizontally above the normal level of the metal in the tank, a pipe in the tank communicating at one end with the lower end of the nozzle, an impeller which is rotatable with small clearance in a cylindrical housing connected to the other end of the pipe, and which has a helical blade with at least one turn and a maximum of three turns, and means for rotating the impeller and thereby pumping metal through the pipe and discharging it upwardly from the mouth of the nozzle in a smooth, non-turbulent, gently-overflowing wave having a level crest.

2. Apparatus as claimed in claim 1, in which the helix angle at the circumference of the blade is 3°–30°.

3. Apparatus as claimed in claim 1, in which the diameter of the helix is 2–5 inches.

4. Apparatus as claimed in claim 1, in which the thickness of the blade is 1/32–1/8 inch.

References Cited by the Examiner
UNITED STATES PATENTS

| | | | |
|---|---|---|---|
| 1,619,406 | 3/27 | Emmert | 113—129 |
| 2,101,854 | 12/37 | Haunz | 117—117 |
| 3,056,370 | 10/62 | Barnes et al. | 113—126 |

GRANVILLE Y. CUSTER, Jr., *Primary Examiner.*

CHARLES W. LANHAM, *Examiner.*